United States Patent [19]

Ishida

[11] Patent Number: 5,566,306
[45] Date of Patent: Oct. 15, 1996

[54] TRANSFER CONTROL APPARATUS FOR INDEPENDENT TRANSFER OF DATA FROM A STORAGE DEVICE TO AN I/O DEVICE OVER A SECONDARY BUS

[75] Inventor: Takuya Ishida, Suwa, Japan

[73] Assignee: Seiko Epson Corporation, Tokyo, Japan

[21] Appl. No.: 581,478

[22] Filed: Dec. 20, 1995

Related U.S. Application Data

[63] Continuation of Ser. No. 75,932, Jun. 11, 1993, abandoned.

[30] Foreign Application Priority Data

Jun. 11, 1992 [JP] Japan ............................. 4-152399
Jun. 3, 1993 [JP] Japan ............................. 5-157869

[51] Int. Cl.⁶ ........................... G06F 13/14; G06F 13/12
[52] U.S. Cl. ...................... 395/309; 395/308; 395/840; 395/847
[58] Field of Search .......................... 395/308, 309, 395/729, 478, 840, 847; 345/200, 202

[56] References Cited

U.S. PATENT DOCUMENTS

| | | | |
|---|---|---|---|
| 4,471,465 | 9/1984 | Mayer et al. | 395/275 |
| 4,949,239 | 8/1990 | Gillett, Jr. et al. | 395/325 |
| 4,987,529 | 1/1991 | Craft et al. | 395/325 |
| 5,131,081 | 7/1992 | MacKenna et al. | 395/275 |
| 5,241,632 | 8/1993 | O'Connell et al. | 395/325 |
| 5,353,417 | 10/1994 | Fucco et al. | 395/325 |

*Primary Examiner*—Jack B. Harvey
*Assistant Examiner*—Jeffrey K. Seto
*Attorney, Agent, or Firm*—W. Glen Johnson

[57] ABSTRACT

A data transfer control apparatus capable of continuously transferring large amounts of data without decreasing the performance of a system CPU. The data transfer control apparatus uses one or more external storage device interfaces to control transfer of data to or form such storage devices, buffer memory interfaces to control transfer of data to and from one or more buffer memory devices, other system and data processing device interfaces, and at least one arbitration unit which controls access to buffer memory data storage. The arbitration element is programmable in response to one or more stored priority values or command signals, and can alter system response to requests for data transfer without accessing the CPU. Data can be efficiently distributed to among devices, including such output devices as televisions having periodic display and non-display periods, or other display devices requiring data on an irregular basis. The result is an increase in system performance for multimedia devices, TV game machines, etc., which require the transfer of large amounts of data, and achieves more compact and lower cost systems. This approach allows the use of slower CPU's and RAM type memory elements, and does not dominate the CPU bus activity.

15 Claims, 12 Drawing Sheets

- - - -▶ CONTROL SIGNAL
⇒ DATA

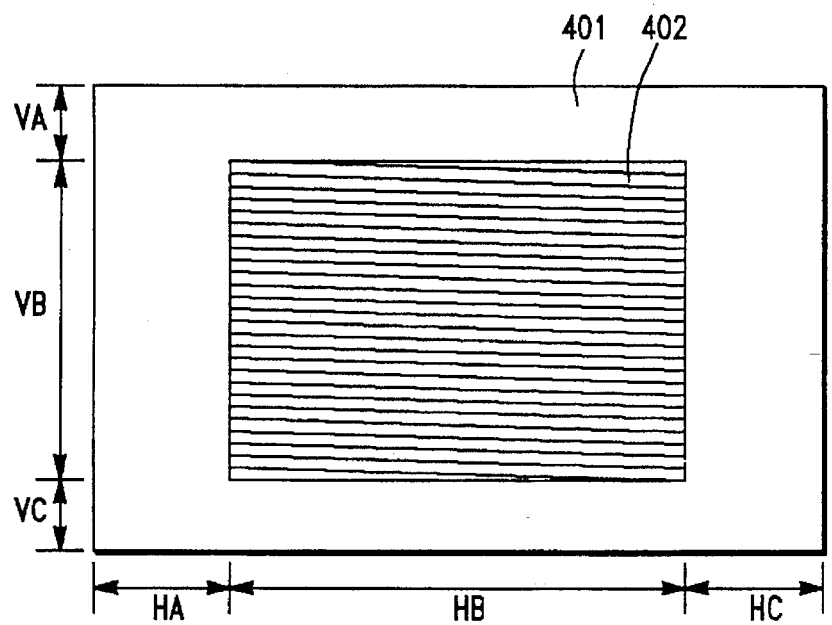
FIG.−4A
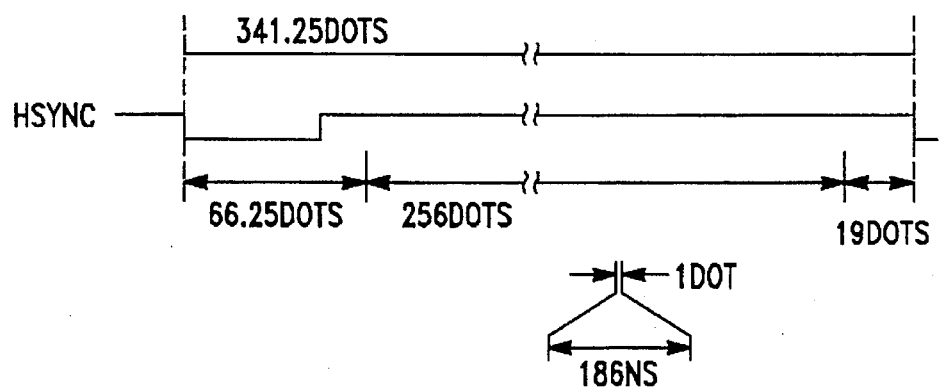
FIG.−4B

TRANSFER CONTROL APPARATUS FOR INDEPENDENT TRANSFER OF DATA FROM A STORAGE DEVICE TO AN I/O DEVICE OVER A SECONDARY BUS

This is a Continuation of application Ser. No. 08/075,932 filed Jun. 11, 1993, now abandoned.

BACKGROUND OF THE INVENTION

1. Field of the Invention

This invention relates generally to data transfer control apparatus used in multimedia devices and television game machines and more particularly to a data transfer controller used in a data processing system that utilizes buffering to distribute data from large capacity external storage devices, such as magnetic or optical storage drives, among various data processing components within the processing system.

2. Related Technical Art

An exemplary configuration for prior art information or information processing devices is shown in FIG. 13. Systems such as shown in FIG. 13 employ a central processing unit (CPU) 601, a DMA controller 701, a main storage device 602, and one or more input/output (I/O) devices 702, among other components, etc., all connected to a CPU or CPU data bus 604. In such a configuration, a device that receives appropriate authorization from a control element such as CPU 601 or DMA controller 701, accomplishes data transfer with input/output device 702 or main storage device 602 using the single CPU bus 604.

In an image reproduction device, however, that operates by receiving image data in picture element units and then playing this back, the image remains incomplete when data are missing during an image display period. It is necessary, therefore, that the image playback portion of the device continually receives data during the image display period. For this reason, the prior art required a configuration in which an image playback device was provided with a dedicated frame buffer memory, and writing of data was performed or controlled by the CPU, asynchronously with image display while reading was performed synchronously with image display. In this technique, in order to transfer the required data without undesirable delay in data processing devices such as image playback and sound playback devices used in multimedia systems, each processing device is provided with a dedicated buffer, as in the above example. Here, the data is transferred in advance in a batch transfer mode using the main system memory or the CPU, and then extracted from the buffer memory for use according to the timing of each data processing device using that data.

However, using the prior art technology as shown in FIG. 13, the CPU bus is continuously occupied during data transfer and cannot be used for other operations. Since the CPU determines how data should be directed to each of input/output device, CPU processing time is also dominated by data transfer operations and determinations when this technique is applied to TV game machines and multimedia devices where frequent dynamic data transfer between various devices is required. This results in markedly decreased overall system performance.

Furthermore, in multimedia systems handling large amounts of data, the amount of time during which a CPU bus is occupied by data transfers to data processing devices has greatly increased in the art. Since this increased CPU bus occupation hinders the operation of the overall system, it is difficult to increase the quality of information presentation without performing processing such as temporally thinning the data. Also, various data processing devices require a dedicated buffer memory to receive data without delay, and it is also necessary to adjust the timing with which the data is read. Multimedia systems in particular require more complicated processing, such as matching the timing between image playback devices, sound playback devices, and other data processing devices. It is also necessary in systems that expand compressed image data in order to present it for viewing, to set a fixed length for the data, even if compression efficiency is somewhat sacrificed, and periodically read the data in order to efficiently access memory.

SUMMARY OF THE INVENTION

In view of the above problems in the art, one purpose of the present invention is to offer a data transfer control apparatus capable of continuous, high capacity, data transfer without decreasing the performance of a system CPU.

Another purpose of the invention is to offer a data transfer control device capable of distributing data to plural data processing devices independent of the CPU bus by matching the timing required by each receiving data processing device.

These and other purposes, objects, and advantages are provided in a data transfer control apparatus having an external interface that connects external storage devices, such as magnetic or optical disk drives, to a data processing system and controls the transfer of data between such devices and the system, a buffer interface that connects a buffer memory to the system in which data read from the external interface is stored, a system interface for exchanging data with system devices that transfer data to and from the buffer memory, and an arbiter that arbitrates access requests issued to the buffer interface and authorizes access according to a pre-established priority scheme.

When the external interface receives data from the external storage device, it issues an access request to write data to the buffer memory along with a desired address in the buffer memory to the arbiter. When the system interface receives a data transfer request from the system device, it likewise issues an access request to read data from or write data to the buffer memory, along with an appropriate address location to the arbiter. The arbiter determines the priority of each access request, that is, arbitrates all issued access requests at time intervals prescribed by a reference signal and authorizes one access request with the current highest order of priority. The buffer interface is configured to access the buffer memory according to the access request authorized by the arbiter.

In further aspects of the invention, a refresh timer is generally provided which issues an access request to execute a refresh operation for the buffer memory to the arbiter at time intervals dependent upon the type of memory being used and a reference signal. The arbiter is programmable so that it can vary the order of priority among the access requests using a control signal or an external instruction which can be implemented using a series of registers to store priority values. This allows implementation of various dynamically changing data access schemes such as where top priority is given to requests for data transfer to image playback devices during at least an image display period and then shifted to other devices during non-display periods.

A series of index registers are used, there being the same number of these registers as there are system interfaces such that there is a 1-to-1 correspondence, and they act as storage elements for several bits of address information. When an access request issued by a system interface is authorized by the arbiter, the buffer interface accesses the buffer memory at an address that is the sum of the address value specified by the authorized system interface and one or more bits stored in the corresponding index register. This allows efficient use of larger memory structures for the buffer memory, and flexible control over blocks of data storage.

During operation, the data transfer control apparatus writes and reads data to and from external storage devices and distributes that data among several internal system devices, using the buffer interface to control accesses to the buffer memory and receive instructions for access to the buffer memory. The arbiter receives and arbitrates requests for access to the buffer memory and issues access authorizations to the originators of such access requests and access instructions to the buffer interface. An external interface exchanges data with external storage devices, issues an access request and address in buffer memory to the arbiter to store data received from external storage devices in the buffer memory, and exchanges data with the buffer interface when access authorization is received. Multiple system interfaces are connected in a 1-to-1 correspondence to exchange data with system devices, and issue an access request with an access address to the arbiter, which reads data to be passed to system devices from the buffer memory or writes data received from system devices to the buffer memory, and exchanges data with the buffer interface when access authorization is received. The arbiter arbitrates access requests according to the order of priority established internally in synchronization with access cycles for the buffer memory, issues access authorization for one access request with the highest order of priority of those issued each access cycle, and at the same time issues an access instruction to the buffer interface. The buffer interface receives an address from the originator of the authorized access request in response to an access instruction, then accesses the buffer memory at that address, and exchanges data with the originator of the access request.

In further embodiments of the invention, at least two or more buffer interfaces and matching arbiters are used, with the buffer interfaces connected to respective independent buffer memories and configured to access them independently. Each arbiter is combined in a 1-to-1 correspondence to an interface such that it authorizes access to a buffer memory through one buffer interface, and the external and system interfaces request access to only one selected arbiter.

A plurality of index registers are used which matches the total number of access request originators, such as all system and external interfaces, and they have a 1-to-1 correspondence with request originators. When the buffer interface receives an access instruction from the arbiter, it accesses the buffer memory at an address specified both by the originator of the authorized access request and several bits of address information stored in the corresponding index registers.

At least one of the system devices connected to the several system interfaces is an image playback device that receives digitized image data in picture element units and plays it back in real time. In this configuration, the arbiter gives top priority to requests for data transfer to the image playback device during at least a display period for the image.

Another data processing system utilizing the apparatus of the invention includes an image playback device that stores data in and reads data from magnetic, optical, and other external storage devices and distributes that data among several system devices which are intended to receive digitized image data in picture element units and play it back in real time. The system also includes a compressed image expansion device that receives and expands one set of digitized compressed image data, and transfers it to the image playback device in real time, and a sound playback device that receives digitized sound data and plays it back. In this system, the refresh timer issues access requests synchronized with horizontal timing or refresh rate of an image display device. Such requests are issued during the retrace period of the image, in a number larger than the number/period required by the buffer memory.

The arbiter performs arbitration during the access request period in synchronization with the access cycle of the buffer memory, according to an established order of priority. During a retrace period, the order of priority generally treats refresh operation of the buffer memory as one or first, data transfer to the sound playback device as two or second, data transfer to the compressed image expansion device as third, and writing of data read from the external storage device as fourth. During the display period for the image, the priority order generally treats data transfer to image playback device first, data transfer to compressed image expansion device second, and writing of data read from the external storage device as third. The arbiter issues access authorization for the one access request with the highest order of priority of those issued each access cycle.

Access instructions are issued to the buffer interface using the dot cycle as the access cycle, which is the basic clock cycle in which the image playback device displays one picture element. The buffer interface receives an address from the originator of the authorized access request, accesses the buffer memory at that address when it receives an access instruction, and exchanges data with the originator of the access request, and also performs a refresh operation when the authorized access request is a refresh request.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4A illustrates a diagram of the display and non-display areas for images during an image display period.

FIG. 4B illustrates the horizontal timing for image display.

An appendix of the numeral designations used in the figures follows the detailed description below.

DETAILED DESCRIPTION OF PREFERRED EMBODIMENTS

Figure 1:
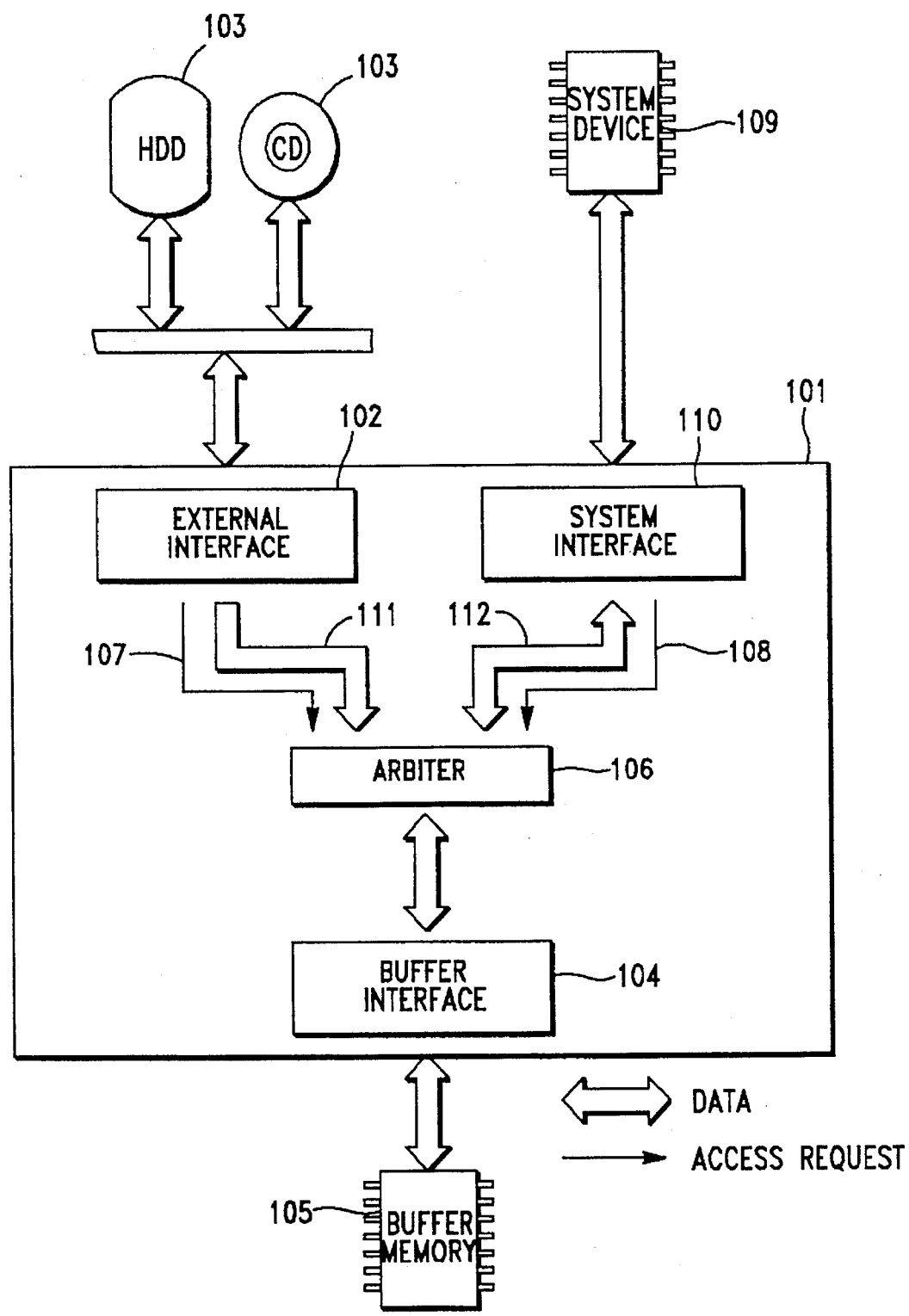
FIG. 1 illustrates a block diagram of a first embodiment of a data transfer control apparatus constructed and operating according to the principles of the invention.

A first embodiment of a data transfer control apparatus constructed and operating according to the present invention is illustrated in the block diagram of FIG. 1. In FIG. 1, one or more external storage devices 103, such as a hard disk, CD ROM or other type of data storage medium, are shown which are used to store data used within or by the system. An external storage device controller (external interface below) 102, is used to control the exchange of data with external storage devices 103, and operates in compliance with one of the many known interface standards such as the SCSI, ISDN proprietary vendor unique interface standards, etc.

A semiconductor memory device 105 is shown in FIG. 1 which is referred to as a buffer memory below, and whose purpose is to store data received from external storage devices 103. Buffer memory 105 is used to buffer or temporarily of store data being retrieved from external storage devices 103 and transferred to a system device 109. In this case, buffer memory 105 is capable of effectively assimilating the difference in access speed between external storage devices 103 and system device 109. By storing data read from external storage devices 103 in buffer memory 105, it is also possible to quickly respond to data requests issued from system device 109. A storage device controller or buffer interface 104 is connected to buffer memory 105 and controls and effects transfer or exchange of data with memory 105. Semiconductor or data processing device 109 (system device) is another device that exchanges data with buffer memory 105 for processing using a system interface 110 for this communication link.

A request arbitration element or arbiter 106 is used to authorize or control access or accesses, and acts to arbitrate access requests issued for purposes of exchanging data with buffer memory 105. A control signal 107 represents an access request for memory 105 from external devices 103, and is issued by external interface 102 to arbiter 106, and an access authorization issued to external interface 102 by to arbiter 106, etc. A control signal 108 represents an access request for memory 105 from system interface 110 to arbiter 106, and an access authorization issued by arbiter 106 to system interface 110, etc. A data bus 111 is used for the exchange of data and addresses between external interface 102 and arbiter 106, while a data bus 112 is used for the exchange of data and addresses between system interface 110 and arbiter 106.

When external interface 102 is instructed to receive data from external storage device 103 and transfer that data to buffer memory 105, an access request is issued (107), along with an address and the data, to arbiter 106 in order to write data to buffer memory 105 at the desired or specified address stored in a register. In the alternative, it is also clear that data read from external storage device 103 can be transferred to another device through a CPU or CPU bus even if it is not transferred to buffer memory 105. In a similar manner, system device 109 issues a request to system interface 110 for an exchange of data, and system interface 110 issues an access request (108) to arbiter 106 in order to exchange data with or receive data from buffer memory 105 which is stored at the specified address stored in registers.

Within a fixed period of time defined by a reference signal, arbiter 106 samples access request 107 from external interface 102 and access request 108 from system interface 110, arbitrates all issued requests according to an order of priority and authorizes the access request with the highest order of priority to proceed with access of buffer memory 105. Below, the originator of an access request is referred to as a request originator, and one special or selected access originator whose access is authorized by arbiter 106 is referred to as the arbitration winner. During the time no access request is not received, no access authorizations and instructions are issued.

When buffer interface 104 receives an access instruction, it accesses buffer memory 105 according to that instruction using a prescribed or predefined system timing. For example, when there is a request to write during an access cycle, external interface 102 is given access authorization and buffer interface 104 receives the address and data issued by external interface 102 and writes it to buffer memory 105. Similar processing is performed during an access cycle in which system interface 110 receives access authorization to write data. In addition, for access cycles in which system interface 110 receives access authorization to read data, for example, buffer interface 104 reads data from buffer memory 105 from the address issued by system interface 110 and transfers the read data, and system interface 110 which in turn receives the data and transfers it to system device 109. When access authorization is not received by an interface, a request is issued again to participate in the next arbitration performed by the arbiter.

If external interface 102, arbiter 106, buffer interface 104, and system interface 110 are all operating in accordance with timing prescribed by the same reference signal, data exchange between them does not require a handshake procedure and can be performed using the access authorization and instruction signals as a trigger. That is, data-driven access can be performed. A configuration is used in which the issuance and arbitration of access requests and the issuance of an access authorization and instruction are performed during one access cycle, access of the buffer memory is performed during the next access cycle, and data is exchanged with the arbitration winner during the next access cycle, all of which are performed in a pipeline fashion. That is, it is possible to perform arbitration for the next access cycle while the buffer memory is being accessed, so that the operating speed of data transfer control apparatus 101 need not be as fast as an image display cycle and the access cycle of buffer memory 105 can be the same as the image display cycle.

Since it is possible to use the data transfer control apparatus of the invention to transfer data without going through the CPU bus as described above, the bus is not occupied by the transfer of data other than data used by the CPU itself, thus enhancing the operation of the system. Moreover, by arbitrating access to buffer memory 105, data can be transferred between external storage device 103 or system device 109 and buffer memory 105. By deciding a suitable order of priority to be established by arbiter 106 at the time or access, efficient data transfer can be performed and the system can be operated without providing a large dedicated buffer memory within the system, thus, decreasing cost. Furthermore, since system device 109 does not have a dedicated memory itself, there is no need to provide a means of memory control, thus facilitating more compact circuitry.

By using a configuration in which the image playback device is given the highest order of priority and the access cycle of the buffer memory is set fast enough to match the display cycle of the image playback device, when the image playback device described above is realized, the image data required by the image playback device can be transferred without delay and without requiring a dedicated frame buffer memory. Further, since it is the timing of the data output or output data that is used in data transfer control apparatus 101, timing for data reading is not required in system device 109, thus further simplifying the circuit configuration.

Figure 2A:
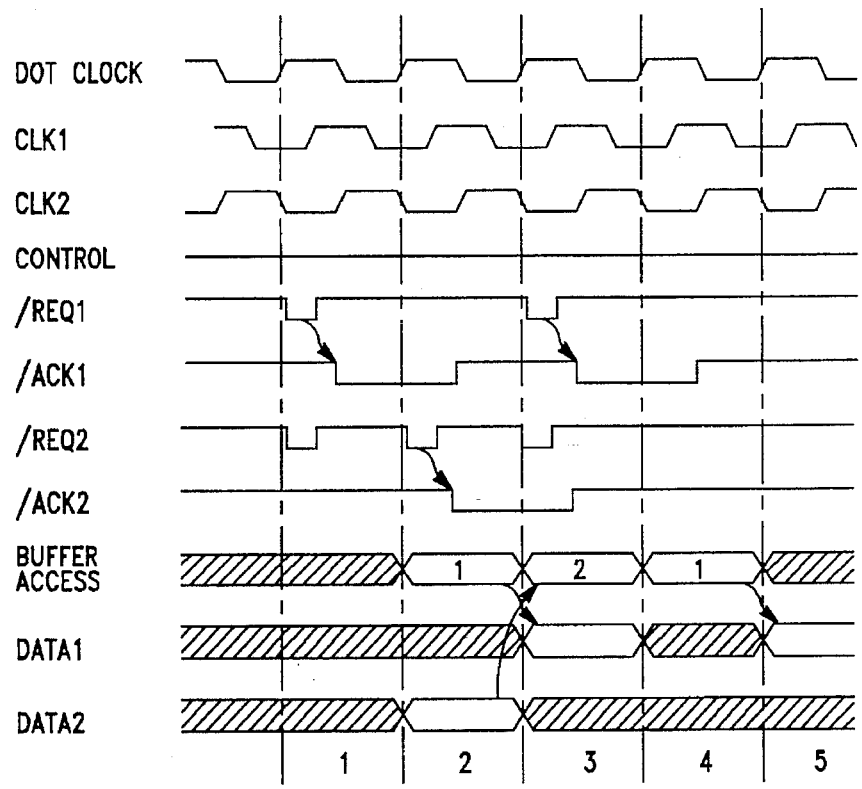
FIG. 2A illustrates waveforms showing a graphical representation of the timing for and operation of each portion of request arbitration circuit shown in FIG. 2B.
Figure 2B:
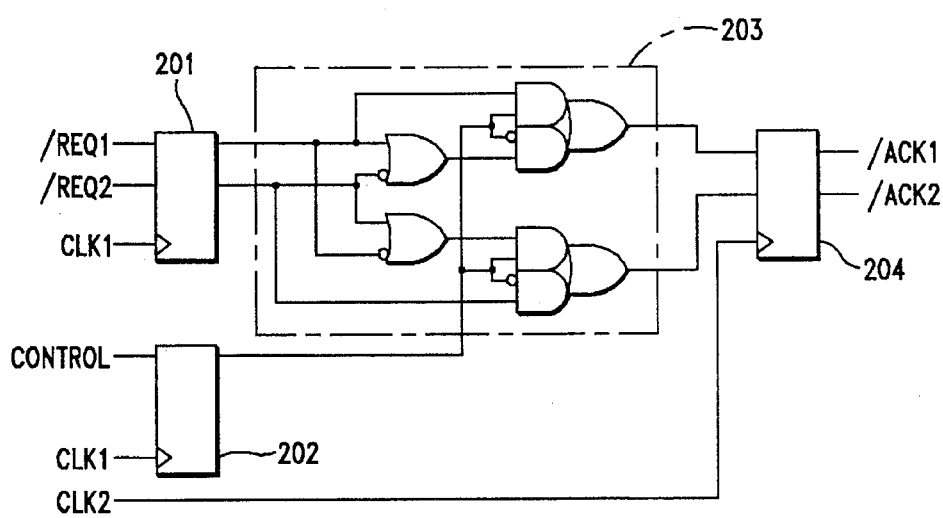
FIG. 2B illustrates a block diagram of a request arbitration circuit useful for implementing the invention.

An exemplary circuit configuration for constructing or implementing arbiter 106 is shown in FIG. 2B. A partial configuration of the circuit for arbiter 106, is shown in FIG. 2B where two access request signals/REQ1 and/REQ2 are received, arbitration is performed according to the order of priority, as varied or controlled in response to a signal Control, and signals/ACK1 and/ACK2 are issued as appropriate, which serve as both access authorizations and instructions.

In FIG. 2B, a D-type flip-flop 20 1 is shown which latches signals/REQ 1 and REQ2 during the rising edge of a clock signal CLK1. Also, 202 is a D-type flip-flop that latches signal Control at the occurrence of the positive going or rising edge of clock signal CLK1. An arbitration circuit 203 and a D-type flip-flop 204 are used to latch the output of arbitration circuit 203 at the positive going or rising edge of a clock signal CLK2 and output/ACK1 and/ACK2. During operation of the circuit of FIG. 2B, access request signals/REQ 1 and/REQ2, and signal Control are received at the beginning of the signal period for CLK1, arbitration is performed according to the order of priority specified by the Control signal, and the arbitration result is issued as the contents of signals/ACK1 or/ACK2 at the beginning of the CLK2 signal. Here, REQ1,/REQ2,/ACK1, and/ACK2 are used as active-low type signals. In FIG. 2B, when the Control signal is High or at a high level,/REQ 1 has the higher priority, and when Control is Low or at a low level,/REQ2 has the higher priority.

An example of how arbitration is performed or the timing used in arbitration is shown in FIG. 2A. The dot clock is a clock signal synchronized to start of each display cycle in which one picture element or is to be displayed by the image playback device, for example. Here, one cycle of the dot clock is equal to one access cycle of the buffer. CLK1 and CLK2 signals represent clock signals operating in synchronization with the dot clock, and are generated in this example by shifting the phase of the dot clock. The pulses in the CLK1 signal have positive or increasing leading edges during the first half of the access cycle, or the dot clock pulse, while those for the CLK2 signal have positive edges during the second half of the access cycle. For purposes of comparison and description, as series of five dot clock cycles (1), (2), (3), (4), and (5) are shown in FIG. 2A, and explained in further details below.

During cycle (1), appropriate/REQ 1 and/REQ2 signals are issued at the same time and received at the start of CLK1. Since signal Control is High at this time, REQ1 has the higher priority and signal/ACK1 is issued at the start of CLK2. In this example,/REQ 1 represents a data read request. The request originator that issued/REQ1 (request originator 1 below) receives signal/ACK1, which informs it that access authorization is granted. Buffer interface 104 also receives/ACK1, informing it that there is an access instruction to transfer data to request originator 1. Also, a request originator that issues/REQ2 (request originator 2 below) receives signal/ACK2 and is informed that it has access authorization. According to the arbitration result obtained during cycle (1), the buffer is accessed during cycle (2). Data is then transferred to request originator 1 during cycle (3) as indicated by the signal DATA1.

During cycle (2), arbitration is also performed for the following cycle, (3). In this example, only/REQ2 is issued and received by the start of signal CLK1 during cycle (2). Since/REQ1 is not issued during this time,/ACK2 is issued at the start of CLK2 regardless of the level of signal Control. In this example,/REQ2 is a data write request. Request originator 2 issues data at the same time as/REQ2 as indicated by the signal DATA2. When buffer interface 104 receives an access instruction in signal/ACK2, it receives DATA2 and writes the data contents to the buffer memory during cycle (3).

During cycle (3), arbitration is also performed for the following cycle (4). In this example, the same processing as used in cycle (1) is executed, and as a result of arbitration, the buffer is accessed in cycle (4) and data transferred to request originator 1 during cycle (5). Since arbitration, buffer access, and data transfer are configured as a pipeline, here, the access cycle of the buffer memory can be achieved or realized within the same cycle time as established for the dot clock. At a typical speed of operation, it is possible to configure the buffer memory from dynamic RAM. Also, since the order of priority between access requests can be varied, the system has greater flexibility than current designs.

Figure 3:
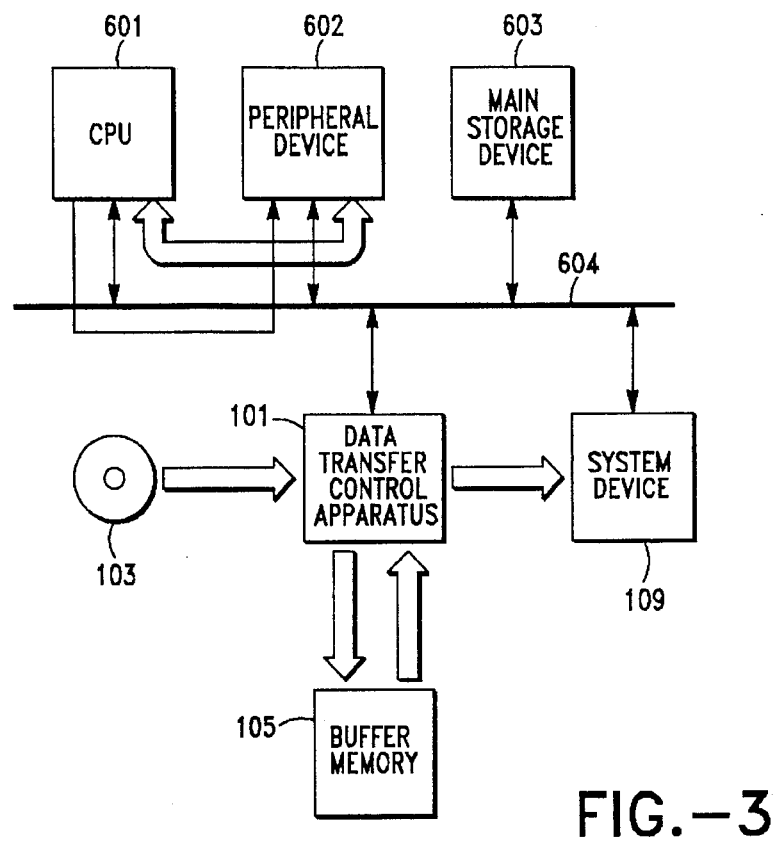
FIG. 3 illustrates a block diagram of an information device using the data transfer control apparatus of the invention.
Figure 13:
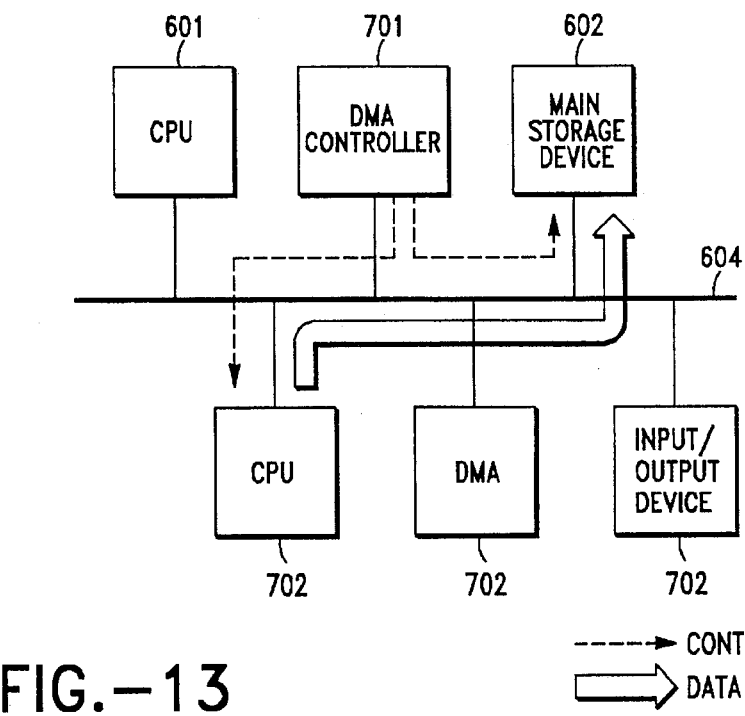
FIG. 13 illustrates a block diagram of a common prior art information device.

A block diagram of an information system that uses a first embodiment of the data transfer control apparatus of the invention is shown in FIG. 3. In FIG. 3, a CPU 601 that controls operation of the overall information device is shown connected to a CPU bus 604 which is also connected to a peripheral device 602 and main storage device or memory 603, which also form part of the system. Peripheral device 602 and main storage device 603 and may be connected to the CPU bus, as shown, or directly to the CPU. The system may also be connected to another bus through peripheral device 602. Data transfer control apparatus 101 is connected to a CPU bus 604, and one or more external storage devices 103 are in turn connected to the external interface of data transfer control apparatus 101, while buffer memory 105 is connected to the buffer interface of data transfer control apparatus 101, and a system device 109 is connected to the system interface of data transfer control apparatus 101.

CPU 601 instructs system device 109 to process data, and specifies the data read address in external storage device 103 to be used to data transfer control apparatus 101, as well as the data storage address to be used in buffer memory 105 and instructs control apparatus 101 to buffer data in this location. CPU 601 also specifies data read address in buffer memory 110 for the data request of system device 109 and instructs transfer control apparatus 101 to buffer data in this location. Data transfer control apparatus 101 accesses external storage device 103, reads the data and buffers the data by writing it to buffer memory 105.

When system device 109 requires data, it requests the data in buffer memory 105 from data transfer control apparatus 101. If access is granted after internal arbitration occurs in response to a request for data, then the data are read from buffer memory 105 and transferred to system device 109. Even when a request for writing data to buffer memory 105 and a request for reading data from buffer memory 105 for data transfer system device 109 overlap, there is no need to devise a timing scheme between external storage device 103, buffer memory 105, and system device 109, since arbitration is performed internally and access to buffer memory 105 is authorized for the request with the higher order of priority. It is only necessary to devise a timing scheme between each of the devices and data transfer control apparatus 101.

As described above, it is possible to exchange data between external storage devices and system devices independently of the CPU or CPU bus, which controls the data transfer control apparatus of the invention. The processing time of the CPU, therefore, is not occupied by the transfer of data other than for data it uses for itself, and the system can operate more efficiently. Using this kind of configuration, efficient data transfer is possible by establishing a suitable order of priority to be used during arbitration operations by arbiter 106.

As a specific example, an image playback device that receives digitized image data in picture element units and plays the data back in real time can be used as system device 109. Here, of course, the image data in picture element units is not limited to RGB (Red-Green-Blue) type data or YUV or other digital type data, and the form of the data may be palette numbers corresponding to image data stored by the image playback device or in another form that indirectly expresses information for one picture element. Since the image playback device receives the image data in picture element units and plays it back in real time as described above, when the data in the buffer memory is transferred directly to accommodate this activity, the stored data is mainly in the form of a background image or other still-type image. That is, this type of image is not compressed, or if it is compressed, it is compressed by a method that allows expansion in real time, since the image is otherwise incomplete if data are missing during the display period.

A diagram for explaining the timing and scanning used during each period of image display is shown in FIG. 4A. In FIG. 4A, the periods used for image display and retracing are depicted in the form of a screen image appearing during one frame period, with the slanted lines representing scanning lines. In FIG. 4A, an overall display 401 is presented during one frame period, with the regions HA and HC occurring during horizontal retrace periods, while HB covers the horizontal display period. VA and VC represent the display during vertical retrace periods, and VB the vertical display period. That is, in one frame period, the area inside of the solid line 402 is the image displayed, and the remaining area is a non-display image area. Since the image will become incomplete if data are missing during the image display period for area 402, as described above, the image playback device must be able to continually accept data during the image display period. In this example, requests for data transfer to the image playback device are given highest priority during the image display period. In this manner, dropout of data in the image playback device is prevented.

The top priority of the image display period established here refers to the top priority related to the arbitration of data transfer requests which are performed to provide the image playback device with selected picture elements during the desired image display period. Depending on the configuration of the system, of the total system time it takes to display an image on the screen, arbitration of data requests takes about as much time as several picture elements. The specification of the order of priority can be performed by the signal Control shown in FIG. 2B.

An exemplary horizontal synchronization signal (HSYNC) is shown in FIG. 4B which establishes display synchronization in the horizontal direction. The time, or number of dots, between one drop in the level of HSYNC to the next is one horizontal period. In this example, one horizontal period is equivalent to the display time for 341.25 picture elements. Assuming that 256 of these dots are used as picture elements, then the remaining time for about 85.25 dots or picture elements is used as a non-display period. In this case, data transfer to the image playback device receives top priority during the image display period for the 256 picture elements. In this example, the length of time for displaying one picture element is about 186 ns, which is definitely not high speed with respect to the typical access cycle of dynamic RAM, thus, making it possible to configure buffer memory from dynamic RAM and perform buffer access in synchronization with image display.

Figure 5:
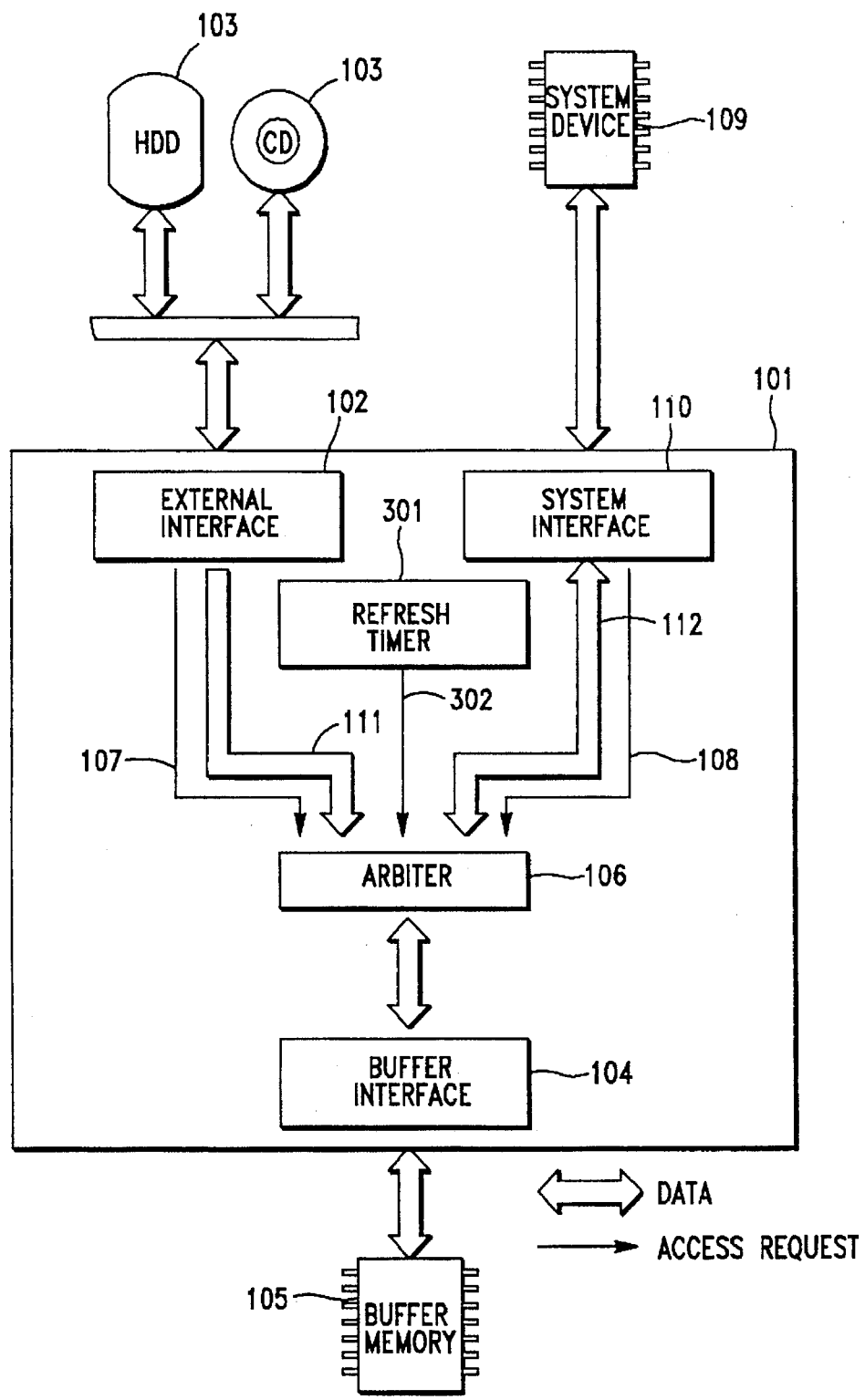
FIG. 5 is a block diagram of a second embodiment of the data transfer control apparatus of the invention.

A block diagram of a second embodiment for the data transfer control apparatus of the invention is illustrated in FIG. 5 where a refresh request element or device, referred to as a refresh timer, is used to issue access requests to the buffer memory for executing a refresh. In FIG. 5, a refresh timer 301 issues requests to arbiter 106 to refresh buffer memory 105 during a period prescribed by a reference signal. Arbiter 106 arbitrates access request 107 from external interface 102, access request 108 from system interface 110, and access request 302 from refresh timer 301, according to the order of priority for all issued requests within a fixed period prescribed by a reference signal, and it authorizes access to buffer memory 105 for the access request having the highest order of priority.

Buffer interface 104 refreshes buffer memory 105 when the access request authorized by arbiter 106 is refresh request 302 issued by refresh timer 301. Even in a case in which the buffer memory is dynamic RAM, data buffering can be performed while also performing refresh operation. Therefore, by using dynamic RAM for the buffer memory, lower cost, and more compact systems can be realized.

Figure 6:
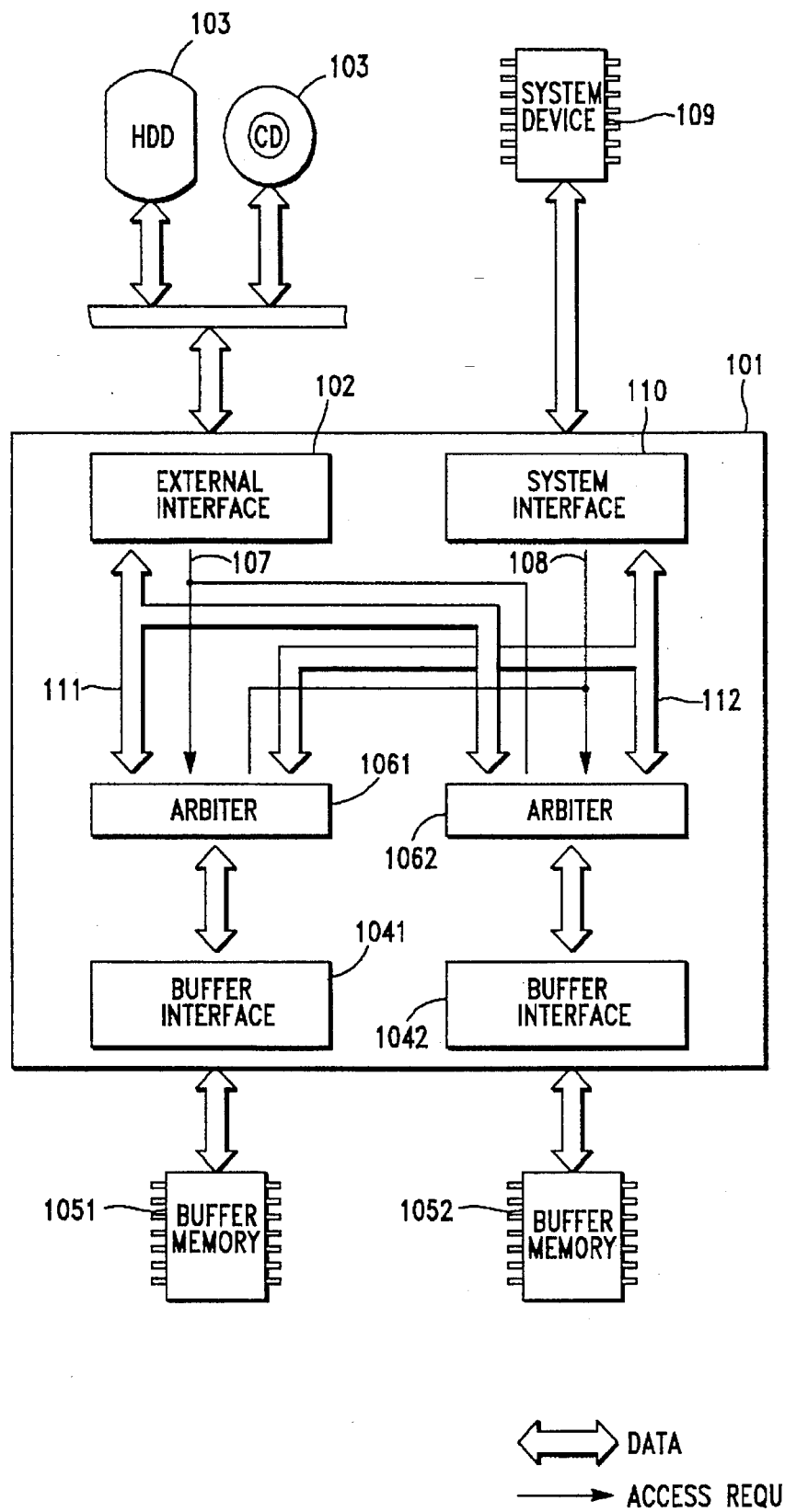
FIG. 6 illustrates a block diagram of a third embodiment of the data transfer control apparatus.

A block diagram of a third embodiment of the data transfer control apparatus of the invention is shown in FIG. 6, in which two buffer interfaces and two arbiters are employed. In FIG. 6, buffer memories 1051 and 1052 are each accessed independently of each other and are connected to and accessed by buffer interfaces 1041 and 1042, respectively. Each arbiter 1061 or 1062 issues access authorization for access to one buffer memory by only one buffer interface. When external interface 102 and system interface 110 require access to a buffer memory, they issue an access request to only one arbiter 1061 or 1062 each time. Arbiters 1061 and 1062 arbitrate all issued requests and authorize access according to the order of priority in a fixed period prescribed by a reference signal.

Using this approach, two buffer memories can be used in parallel. When data updating and playback are repeated dynamically, such as in a multimedia system, it is now possible to operate so that data in one buffer memory is updated to the data to be played back during the next playback cycle while data in the other buffer memory are being played back. In this embodiment, two buffer memories are used in parallel, but it will e readily apparent to those skilled in the art that a configuration is also possible in which three or more arbiters, buffer interfaces, and associated buffer memories are used. Also, the buffer memory connected to each buffer interface may be formed as one memory area or a series of any number of individual units.

Figure 7:
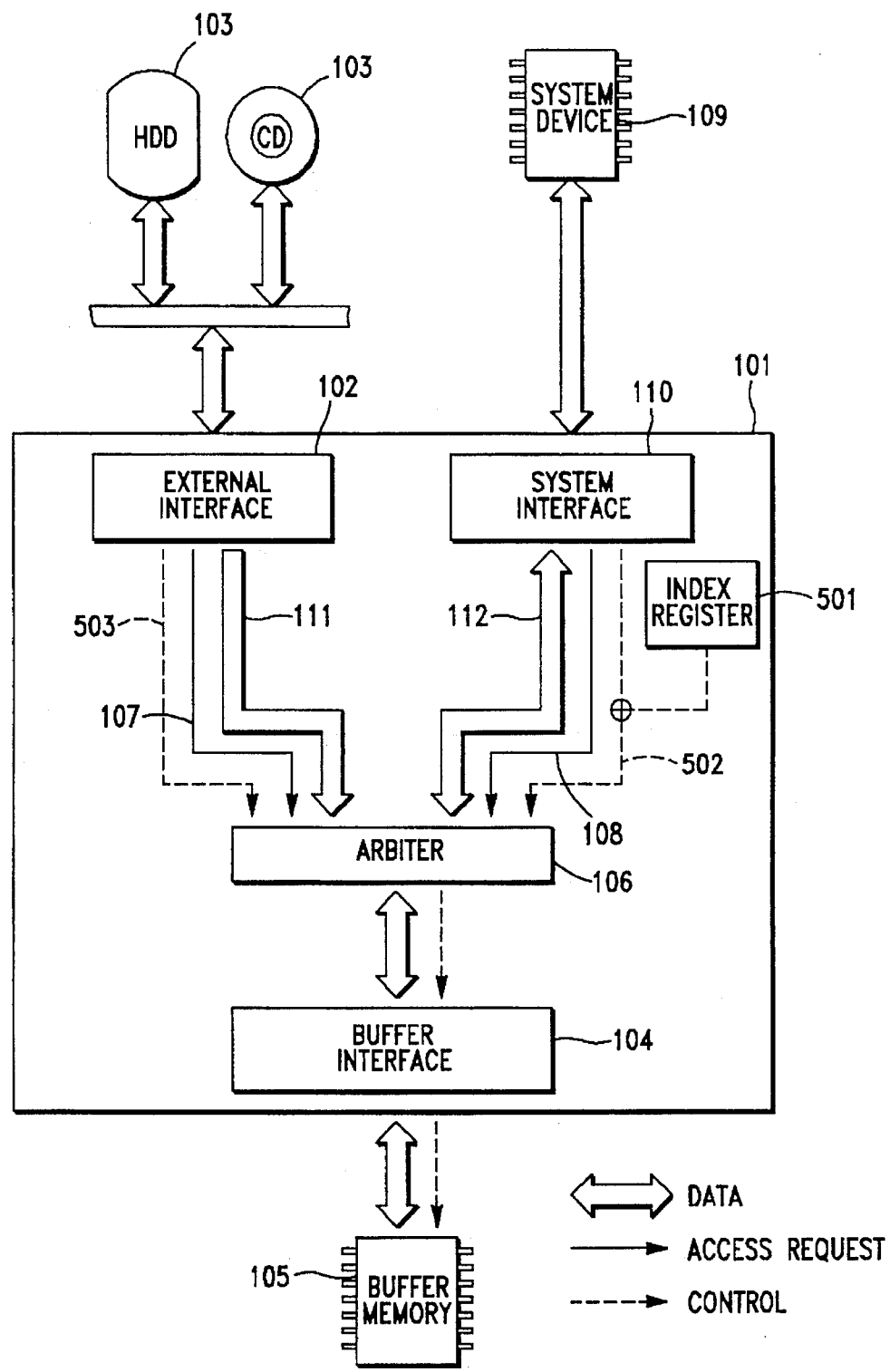
FIG. 7 illustrates a block diagram of a fourth embodiment of the data transfer control apparatus.

A block diagram of a fourth embodiment of the data transfer control apparatus of the invention is shown in FIG. 7, in which a memory element is used to store several bits of the buffer memory address. In FIG. 7, one or more index registers 501, of which there are the same number as system interfaces 110, is connected to receive and store several bits or part of the address used for data in buffer memory 105. That is, an address 502 in buffer memory 105 is formed by adding bits stored in index register 501 to another address or address value issued by system interface 110. When system interface 110 is given access authorization by arbiter 106, buffer interface 104 exchanges data with buffer memory 105 according to address 502, which differs from the address supplied by interface 110.

By using this configuration, if or as the size of buffer memory 105 is expanded, it is no longer necessary to expand the number of bits in the memory address held in system interface 110, thus making it possible to easily handle larger memory sizes with minimal changes to existing operating instructions or software. In addition, by rewriting the value or values stored in index register 501, the overall memory area available in buffer memory 105 can be used or subdivided into smaller units or memory blocks. This switching of blocks of memory makes it possible, particularly in the case of multimedia systems in which there are applications that reproduce data using various types of media, to clearly divide the buffer memory according to specific applications.

In the above example, a configuration one system device was used. However, configurations having several system devices are also possible, and one such configuration is explained below.

Figure 8:
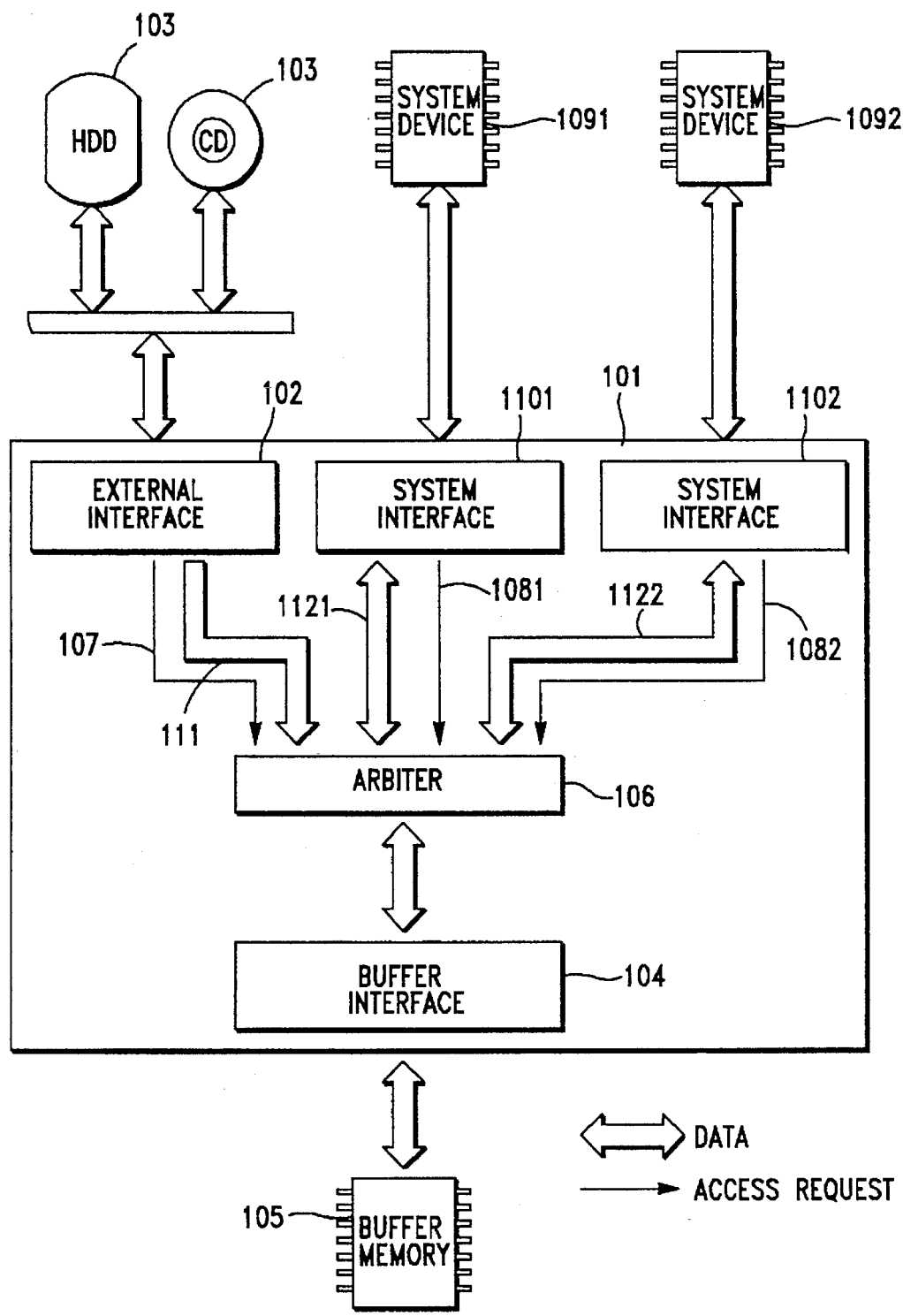
FIG. 8 illustrates a block diagram of a fifth embodiment of the data transfer control apparatus.

A block diagram showing a fifth embodiment of the data transfer control apparatus of the invention is shown in FIG. 8, in which two system interfaces are employed. Separate system devices 1091 and 1092 operate independently of each other and are connected to system interfaces 1101 and 1102, respectively. When it is necessary to exchange data with system device 1091 or 1092, system interfaces 1101 or 1102, respectively, issue an access request to arbiter 106 together with the appropriate address in buffer memory 105 at which the data required by system device 1091 or 1092 resides.

Arbiter 106 receives access requests from external interface 102 and system interfaces 1091, 1092, in synchronization with the timing of the access cycle of buffer memory 105, performs arbitration in accordance with internally established order of priority, and issues access authorization to the one request originator, of those issued each access cycle, having the highest order of priority. At the same time, arbiter 106 also issues an access instruction to exchange data with the arbitration winner. If or when an access request is not received, an access authorization and access instruction are not issued. When buffer interface 104 receives an access instruction, it accesses buffer memory 105 according to that instruction in accordance with prescribed timing. Using this approach, only one of external interface 102 and system devices 1091 and 1092 exchange data using one access of buffer memory 105, whereby each can transfer the required data even if there are several system devices.

Figure 9:
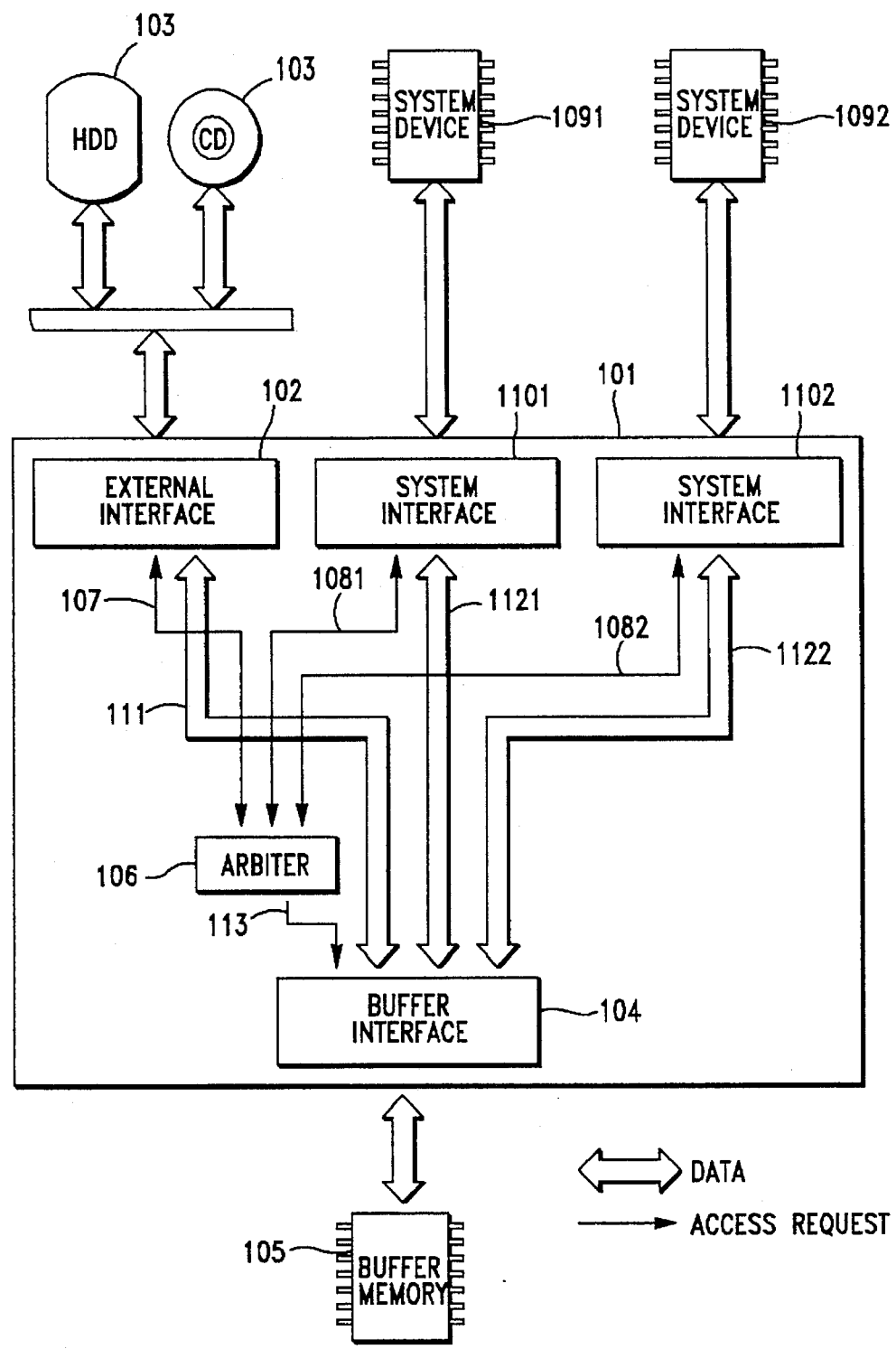
FIG. 9 is a block diagram of a modification of the embodiment of FIG. 8.

A block diagram showing a modification to the fifth embodiment of the data transfer control apparatus is shown in FIG. 9. In this example, arbiter 106 issues access instruction signal 113 to buffer interface 104 which instructs it to exchange data between buffer memory 105 and the arbitration winner—external interface 102 and system devices 1101 and 1102—i.e., request originators, given access authorization by arbiter 106. Data bus 111 from external interface 102 and data buses 1121 and 1122 from system interfaces 1101 and 1102, respectively, are connected to buffer interface 104 and exchange data and addresses directly. Buffer interface 104 selects the bus according to access instruction signal 113 from arbiter 106 to establish which bus is used and which data and addresses are exchanged.

In the fifth embodiment and the modification described above, a case was explained in which two system interfaces 110 and two system devices 109 are used, but it is also possible to employ additional system interfaces which are connected to the same number of system devices.

As described above, by using a data transfer control apparatus having multiple system interfaces, CPU 601 is seen as one type of system device 1091, 1092 in the example configuration of an information device shown in FIG. 3 and can be connected to the system interface. By using this kind of configuration, it is possible to exchange data between CPU 601 and buffer memory 105.

In this manner, by using the data transfer control apparatus of the invention it is possible to transfer data without going through the CPU bus and, therefore, the bus is not occupied by data transfers other than as needed by the CPU itself, thus improving operation of the system. Moreover, by arbitrating access of buffer memory 105, data can be exchanged with many system devices 1091 and 1092. By deciding on a suitable order of priority to be established by arbiter 106, efficient data transfer can be performed and the system can be operated without providing a large dedicated buffer memory within system devices 1091 and 1092, thus lowering system manufacturing cost. Furthermore, since system devices 1091 and 1092 do not have dedicated memory, there is no need for a means to perform memory control, thus facilitating more compact circuitry.

As described in the example of the first embodiment, when an image playback device is used as system device 1091 or 1092, the image becomes incomplete when data are missing during the image display period since the image data are received in picture element units and played back in real time. However, by giving the image playback device the highest order of priority during the image display period, the image data required by the image playback device can be transferred without delay when the access cycle of the buffer memory is fast enough to match the image display cycle of the image playback device. This makes it unnecessary to provide the image playback device with a dedicated frame buffer memory. Also, since the timing of data output is used in data transfer control apparatus 101, special timing for reading data is not required in system devices 1091 and 1092, thus, further simplifying circuit configuration.

Another specific example that may be considered is the connection of a TV receiver and an ADPCM type sound playback device. In this case, these two components require or use data with differing format types and timing. However, by connecting them separately to system interfaces 1091 and 1092, for example, the required timing can be easily matched and synchronized with.

Further improvement is provided by the invention when the order of priority used by the arbiter is varied or variable by programming. In one configuration, for example, digital image data and compressed image data stored on a CD ROM connected to the external interface are both buffered in the buffer memory. The digital image data are then transferred to a video signal playback device connected to one system interface, while the digital compressed image data are transferred to a data expansion device connected to another system interface and then sent to the video signal playback device after data expansion, and displayed on the screen.

As explained in reference to FIG. 4 above, in a TV receiver there is a display period in which a screen of image data is displayed and a retrace period between such display periods, and data are continuously required during display periods, but not during retrace periods. In this case, the video signal playback device operates in synchronization with the TV receiver, but the data expansion device continually expands data. Therefore, during the display period for the TV receiver, digital image data must have the highest order of priority. Since the digital compressed image data is transferred to a data expansion device and continually expanded, however, it is effective to transfer it in batches or packets during non-display periods. Therefore, during a non-display period, the digital compressed image data receives the highest order of priority.

When the buffering of data from a CD ROM is given a lower order of priority than image data during a display period, and a lower order of priority than compressed image data during a non-display period, image playback can be performed without interruption. However, if the writing of data to the buffer memory from the data expansion device always loses out to read requests in arbitration (lower priority), the buffering of data for playback will not be performed. Therefore, if the order of priority of compressed data is positioned lower than the order of priority of data buffering during the display period, data buffering is performed in the case of image data transfer.

By varying the order of priority of arbitration by an arbiter to an optimal condition, depending on the operating conditions or mode of the display system, data transfer can be performed efficiently in systems such as multimedia systems requiring the transfer of various types of dam without undesirable delay.

Figure 10:
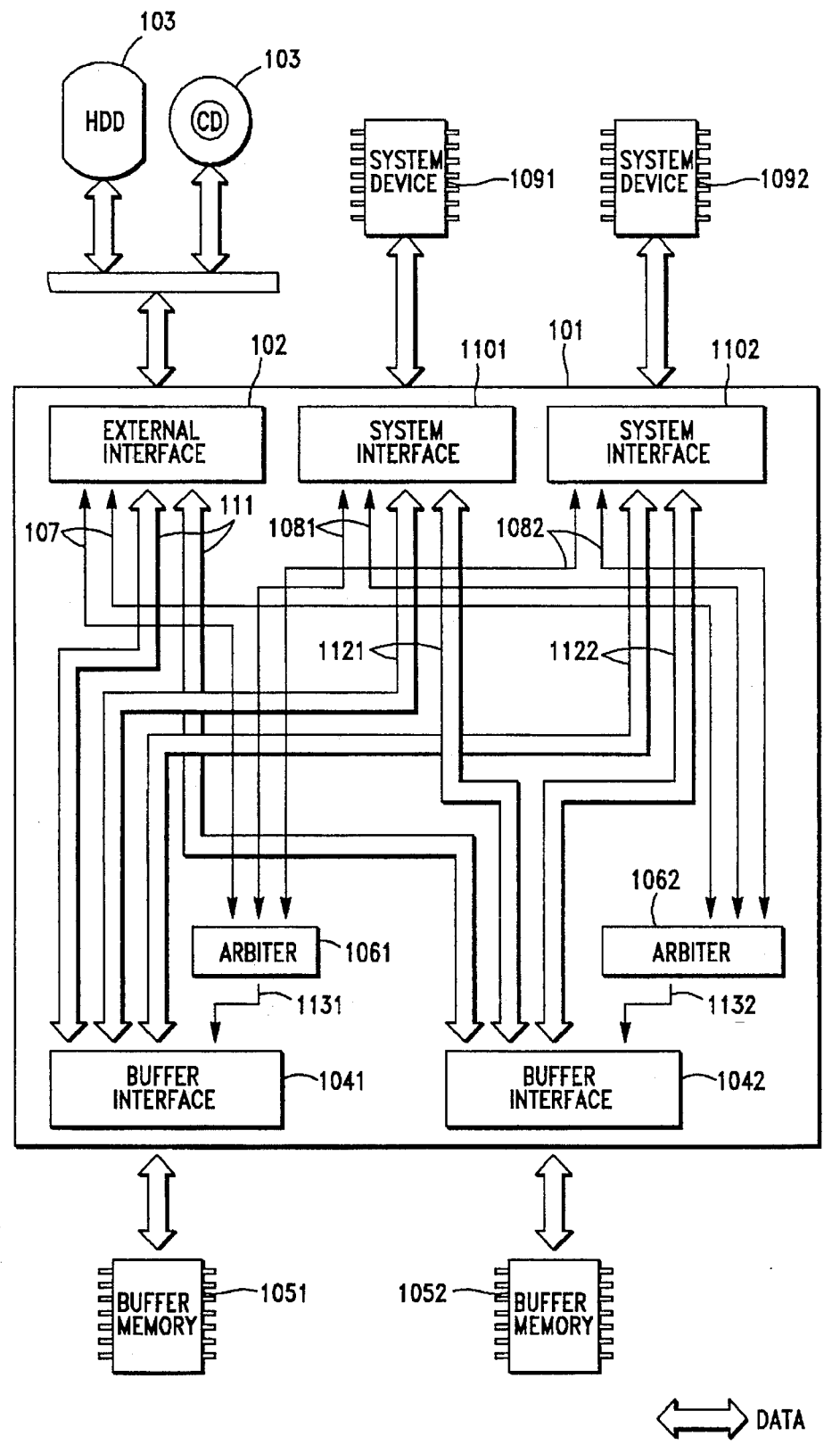
FIG. 10 illustrates a block diagram of a sixth embodiment of the data transfer control apparatus.

A block diagram of a sixth embodiment of the data transfer control apparatus of the invention is shown in FIG. 10. In this embodiment, there are two buffer memories 1051 and 1052, with two buffer interfaces 1041 and 1042, and two arbiters 1061 and 1062 configured in a 1-to-1 correspondence with them. Here, the configuration of arbiters 1061 and 1062, buffer interfaces 1041 and 1042, and buffer memories 1051 and 1052 can be the same as in seen in FIG. 9. In FIG. 10, an external interface 102 issues an access request to write data to either buffer memory 1051 or 1052 during one buffer access, while system interfaces 1041 and 1042 issue access requests to exchange data with buffer memories 1051 or 1052 during one buffer access. Signals 107, 1081, 1082 are access request and access authorization control signals, and lines 111, 1121, and 1122 designate data and address buses.

When external interface 102 is instructed to receive data from external storage device 103 and to transfer that data to buffer memory 1051 or 1052, it issues an access request to write the data to buffer memory 1051 or 1052 at the address held in the register, along with the address and data. Which buffer memory 1051 or 1052 is to be written to is designated by a value stored in the register at this time, and external interface 102 requests to write data to only one buffer memory during one access period.

When it is necessary for system interfaces 1101 and 1102 to exchange data with respective data processing devices 1091 and 1092, they issue an access request to exchange data with buffer memory 1051 or 1052 at the address held in the register and the address. Which buffer memory 1051 or 1052 data is to be exchanged with is held in the register at this time, and system interfaces 1101 and 1102 request to exchange data with only one buffer memory during one access period.

Arbiters 1061 and 1062 receive access requests in synchronization with the access cycle timing for each of buffer memories 1051 and 1052, perform arbitration according to an internally established order of priority, issue an access authorization to the one request originator of those issued each access cycle with the highest order of priority, and also issue an access instruction at the same time to buffer interfaces 1041 and 1042 to exchange data with the arbitration winner. When buffer interfaces 1041 and 1042 receive an access instruction, they access the respective buffer memories 1051 and 1052 according to the instruction, at prescribed timing. Since arbiters 1061 and 1062 and buffer interfaces 1041 and 1042 have a type of 1-to-1 correspondence, they can be configured as in the embodiment of FIG. 9, and operate as explained in reference to FIG. 9. In this embodiment, two buffer memories were used, but more than two can be employed as desired.

Using the data transfer control apparatus shown as a sixth embodiment, it is possible for differing request originators to simultaneously exchange data with different buffer memories, and the overall system can operate more efficiently. For example, when an image playback device is connected as one data processing device 1091, image display is incomplete when data are missing during the display of the image, and, therefore, it is necessary to give priority to the transfer of the data. However, even if one buffer memory is occupied, the other buffer can exchange data with another device during that time. It is also possible to play back moving images by buffering the data to be displayed in successive screens while one screen is being displayed and then switching between memory sources for data.

Figure 11:
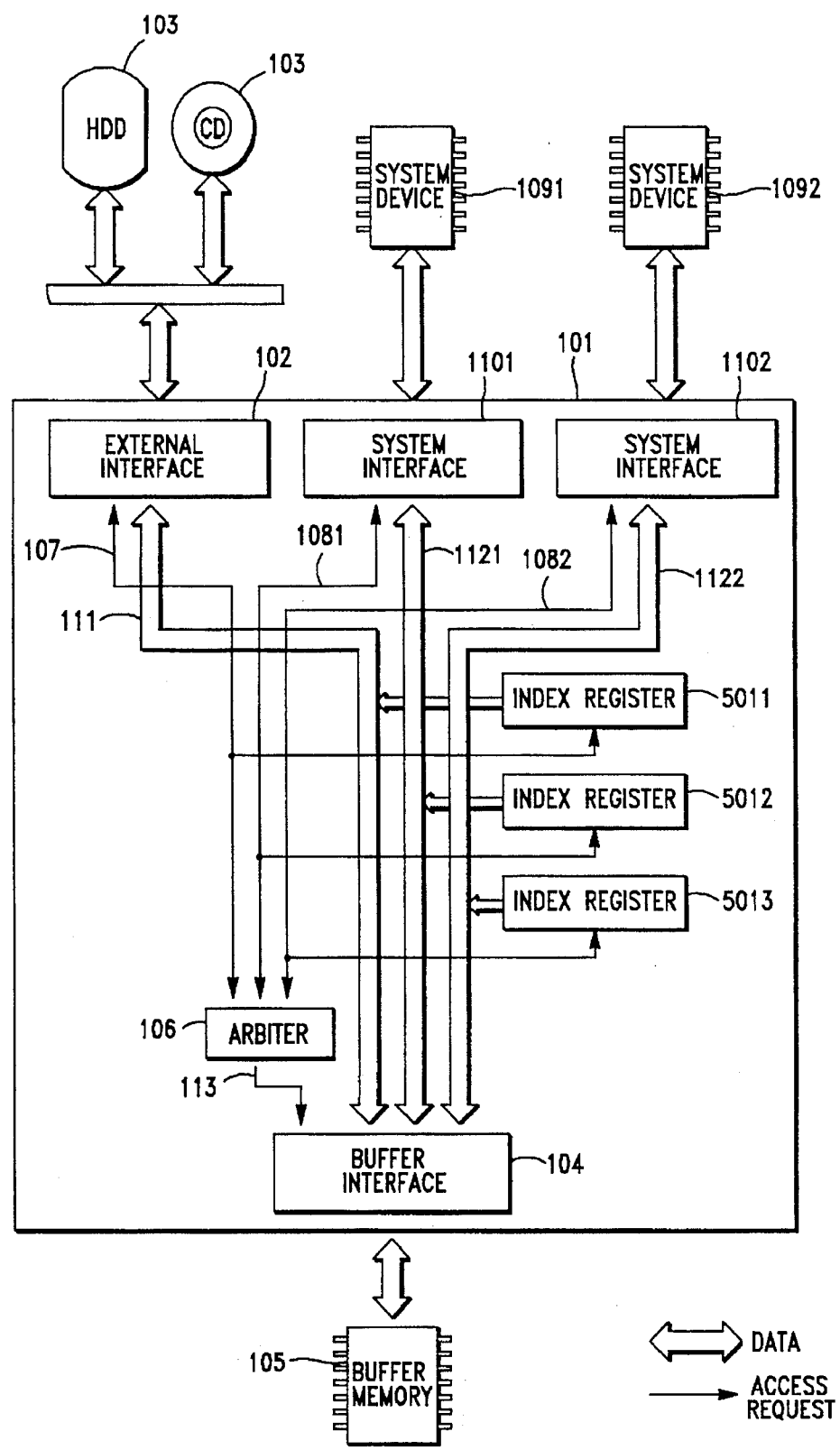
FIG. 11 illustrates a block diagram of a seventh embodiment of the data transfer control apparatus.

A block diagram of a seventh embodiment of the data transfer control apparatus is shown in FIG. 11. In FIG. 11, a series of three index registers 5011 to 5013 are shown, there being the same number as the combined number of external interface 102 and system interfaces 1101 and 1102 such that there is a 1-to-1 correspondence. Index registers 5011 to 5013 store several bits of the access address used for buffer memory 105. Here, it is assumed that the address in buffer memory 105 is 17 bits and that index registers 5011–5013 store one of those bits. Index register 5011 corresponds to external interface 102, index register 5012 corresponds to system interface 1101, and index register 5013 corresponds to system interface 1102.

A request originator issues an access request and an address in order to access buffer memory 105 at, or using, a 16-bit address value. Index registers 5011–5013 add one bit to the address value issued by each of the corresponding request originators to indicate a final address value where data is stored. For example, index register 5012 adds 1 bit to the 16-bit address issued by system interface 1101 to provide a storage address designation comprising 17 bits, which is provided to buffer interface 104. Buffer interface 104, therefore, can control a buffer memory with 17-bit addresses. To each request originator, though, the buffer memory appears as a series of 16-bit addresses. Using the 17-bit address scheme allows subdividing and accessing the buffer memory as paged memory by index registers 5011–5013, and the entire memory can be accessed by simply using CPU to rewrite the values stored in index registers 5011, 5012, and 5013.

As described above, using the controller of the seventh embodiment, buffer memory size can be increased without greatly changing the system or impacting its operations, thus, simplifying system expansion.

Figure 12:
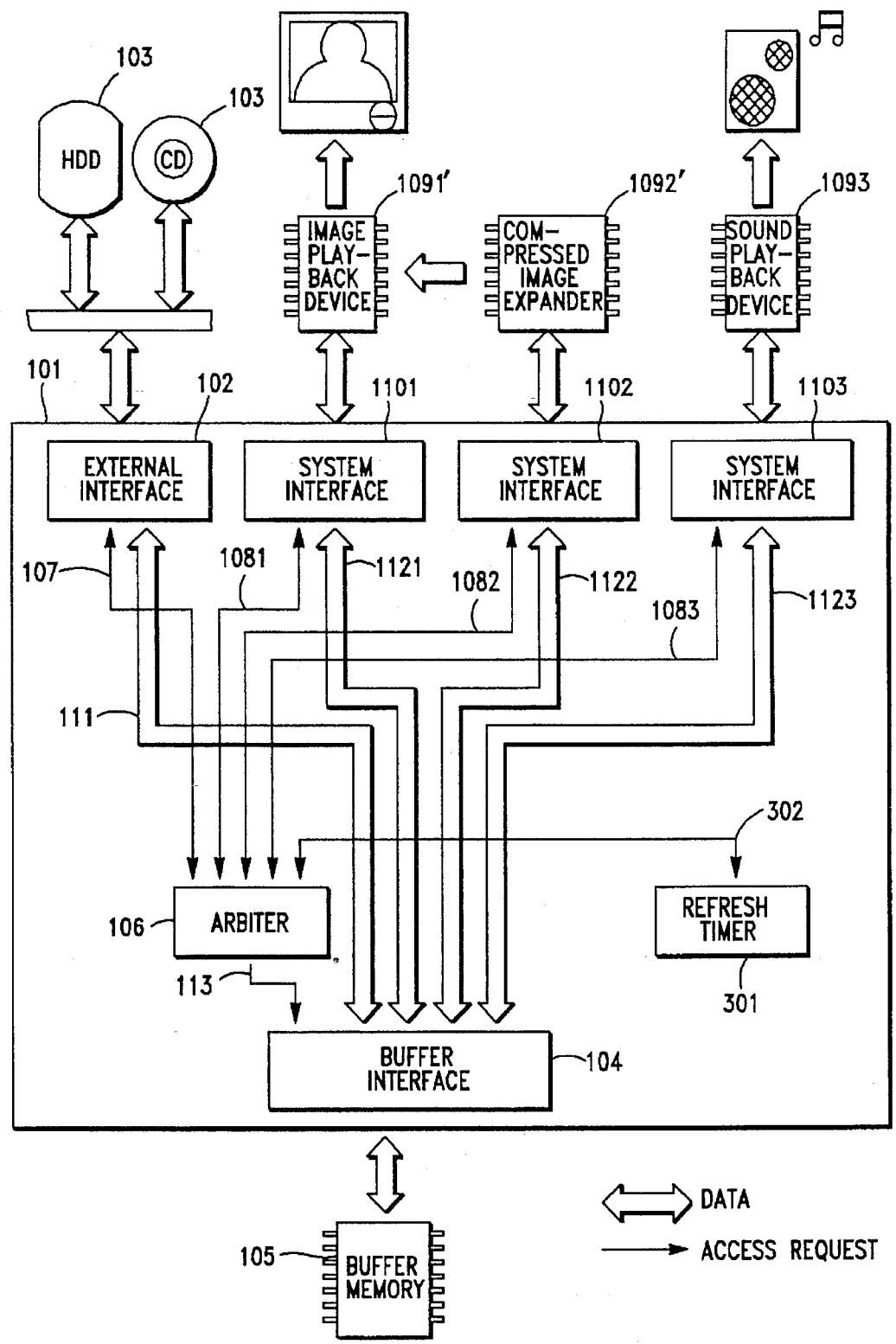
FIG. 12 illustrates a block diagram of an eighth embodiment of the data transfer control apparatus.

A block diagram of an eighth embodiment of the data transfer control apparatus is shown in FIG. 12. In this embodiment, there are at least three system interfaces 1101–1103, and each system interface is connected to at least one image playback device, a compressed image expansion device, and a sound playback device as data processing devices 1091', 1092', and 1093. In this example, image playback device 1091' is connected to system interface 1101, compressed image expansion device 1092' is connected to system interface 1102, and sound playback device 1093 is connected to system interface 1103. In this embodiment, the three system devices are used, but it is possible to connect more system devices to corresponding system interfaces on a 1-to-1 basis. The configuration of external interface 102 and system interfaces 1101–1103 can be the same as explained in relation to FIG. 9.

Compressed image expansion device 1092 is a device that expands image data that has been previously compressed to a high degree by an encoding scheme, such as one using the Lanrengusu or Haufman encoding techniques, into picture element data that is played back by image playback device 1091', and transfers that data to image playback device 1091' in real time. In the method described above, image data are not often compressed in picture element units, but rather a certain amount of data is grouped together and compressed as one block. Therefore, compressed image expansion device 1092' has a buffer memory large enough to hold at least one block of compressed image data, at a specified block size. The transfer of data to compressed image expansion device 1092' need not be performed in picture element units, but rather one block of compressed image data need only be transferred before one block of compressed image data is expanded. For example, when compressed image data are used in which sixteen lines of image data are compressed as one block, where the data of one horizontal period is one line, then the data can be expanded and displayed without delay by transferring the compressed image data in sixteen horizontal periods.

By also employing a method where the timing used for data transfer is commenced before the sixteen horizontal periods that start the display, compressed image expansion device 1092' can start transferring data to image playback device 1091' in synchronization with a horizontal synchronization signal for the display device being used, eliminating the need to achieve synchronization in a vertical direction.

Sound playback device 1093 receives digitized sound data and plays it back. In the case of sound data, the frequency of data transfer can be less than that of the image data. For example, when 4-bit sound data sampled by the ADPCM method at a sampling frequency of 32 kHz is used, a data transfer rate of about 128 kbit/s is typically required. Here, when 16-bit data transfer is performed, an 8-kHz period can be used. In the above example shown in FIG. 4B, one data transfer can be performed during two horizontal periods since the horizontal synchronization signal is 15 kHz. In this case, sound playback device 1093 requires a means to buffer data, but since the capacity is about 16 bits, a dedicated buffer memory is not particularly necessary.

Buffer memory 105 can be configured using dynamic RAM type memory elements. Dynamic RAM requires refreshing at a certain rate which depends on the specific circuit structure. For example, in a 16-bit × 65536 word (1 Mbit) dynamic RAM, some memory products or components that are commercially available require a refresh rate of 256 times per 4 ms, but in this case, refresh operations or cycles can be performed on the order of five times during every horizontal period.

Buffer interface 104 accesses buffer memory 105 using the dot cycle, which is the basic clock cycle in which image playback device 1091' displays one picture element, as an appropriate access cycle. When an access request of the arbitration winner is a request to exchange data, data is exchanged between buffer memory 105 and the arbitration winner, and when the arbitration winner is refresh timer 301, buffer memory 105 is refreshed. Refreshing is performed after receiving addresses, and of course the method is not limited to the so-called RAS only refresh cycle or the so-called CAS-before-RAS refresh cycle which are performed by using a counter built into the dynamic RAM.

Refresh timer 301 issues a number of refresh requests to arbiter 106 which is more than the number of times it is necessary to refresh buffer memory 105 during each retrace period for the image display device. Refresh timer 301 requests are issued in synchronization with the horizontal synchronization signal for the display device. For example, for the dynamic RAM mentioned above, a refresh rate of five times per horizontal period is sufficient, and, therefore, five refresh requests are issued during each horizontal retrace period. For example, in the embodiment of FIG. 4B, since a period extending for 66.25 picture elements from a drop in the output level of the horizontal synchronization signal comprises the retrace period, refresh requests are issued over five cycles from that point in synchronization with a drop in the output level of the horizontal synchronization signal.

Arbiter 106 performs arbitration during each access cycle in synchronization with the timing of buffer interface 104 accessing buffer memory 105, i.e., dot clock cycle, and during the retrace period of the image. The order of priority is established according to the relative necessity of obtaining data for each data processing device in the system, and the amount of time to achieve each processing task. An exemplary priority order found useful in implementing the invention is provided in Table I, below.

TABLE I

| Relative Priority Level | Task |
|---|---|
| 1 | Refresh buffer memory 105 |
| 2 | Transfer data to sound playback device 1093 |
| 3 | Transfer data to compressed image expansion device 1092' |
| 4 | Write data read from external storage device 103 |

During the display period of the image, the order of priority will change and an exemplary priority order found useful in implementing the invention during this period is provided in Table II, below.

TABLE II

| Relative Priority Level | Task |
|---|---|
| 1 | Transfer data to image playback device 1091' |
| 2 | Transfer data to compressed image expansion device 1092' |
| 3 | Write data read from external storage device 103 |

Since the required number of refresh requests are issued during the retrace period, the required number of refreshes are performed assuming they win arbitration. Therefore, by having arbiter 106 establish the order of priority as described above during the retrace period, the required number of refresh operations is performed.

Since the transfer of data to sound playback device 1093 only needs to be performed once for every two horizontal periods, access authorization can be issued in a cycle that does not overlap a refresh request and the data can be transferred if the access request is issued during a retrace period. For example, in the above example in which refresh operations are performed during five cycles at the start of each horizontal period, the data can definitely be transferred during a retrace period if the access request is issued in the next cycle or asynchronously and the playback device waits for the issuance of an access authorization.

The transfer of data to the image playback device cannot be interrupted during the image display period, as described above, but by having arbiter 106 establish the order of priority during the image display period, data can be transferred when required in any cycle during the image display period.

The transfer of data to compressed image expansion device 1092' need only occur for the next 16 lines to be displayed, i.e., one block of compressed image data, during 16 horizontal periods in the above example. That is, the data can be transferred during a suitable available or otherwise "open" period, and since the data itself is compressed to a high degree, data transfer need not be performed as often as for image playback device 1091'. By having arbiter 106 establish the order of priority during the display and retrace periods for the image, data can be transferred without interfering with refresh operations or data transfer to other system devices requiring a higher degree of real time operation.

It is possible to combine the configurations of the various embodiments of the invention; e.g., two or more buffer memories 105 can be used, in which case more than a sufficient period of time can be allotted for transferring data to compressed image expansion device 1092' by placing the data for image playback device 1091' and compressed image expansion device 1092 in separate buffer memories. The writing of data read from external storage device 103 need not be performed in real time and can be performed during an open cycle. By having arbiter 106 establish the order of priority during the display and retrace periods of the image, writing to buffer memory 105 can be performed without interfering with data transfer to other system devices or refresh.

Furthermore, in a configuration in which two or more buffer memories 105 are used, the frequency of access cycles in which access requests are not issued for one or more of the buffer memories will increase, and, therefore, the writing of data can be performed more efficiently by appropriately selecting open or empty buffer memories.

As described above, the data transfer control apparatus of the invention stores data read from an external storage device in a buffer memory, arbitrates requests from various devices within the system desiring access to the buffer memory, and exchanges data with the various devices. The CPU need not control data transfer, and since the CPU bus is not occupied by data transfer, the system performance of multimedia devices and TV game machines requiring the transfer of large volumes of data can be improved. Since inexpensive, compact DRAM can also be used to construct the buffer memory, systems using this data transfer control apparatus can be made more compact and at lower cost. Also, since a CPU, which controls the system, whose bus cycle is about the same as the access cycle can be used, a low speed CPU can also be used.

Furthermore, the ability to simultaneously access several buffer memories makes it possible to continuously update and use data. By being able to vary the order of priority for access authorizations, data can be efficiently distributed to devices such as a TV which employ periodic display and non-display periods, and devices requiring data on an irregular basis. Being able to configure memory areas as required by the specific application by using index registers, multimedia systems can be easily configured.

Even in systems with data of varying bit-lengths, or that perform expansion of compressed image data in which the data read timing is not periodic, data-driven memory access can be performed through arbitration, whereby memory access can be made efficient without sacrificing image compression efficiency.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

| Appendix of Numeral Designations Used in the Figures | |
|---|---|
| 101 Data transfer control apparatus | 604 CPU bus |
| 102 External interface | 701 DMA controller |
| 103 External storage device | 702 Input/output device |
| 104 Buffer interface | 1041 Buffer interface |
| 105 Buffer memory | 1042 Buffer interface |
| 106 Arbiter | 1051 Buffer memory |
| 107 External interface access request | 1052 Buffer memory |
| 108 System interface access request | 1061 Arbiter |
| 109 System device | 1062 Arbiter |
| 110 System interface | 1081 System interface access request |
| 111 Data bus | |
| 112 Data bus | 1082 System interface access request |
| 113 Access instruction signal | |
| 201 D-type flip-flop | 1083 System interface access request |
| 202 D-type flip-flop | |
| 203 Arbiter circuit | 1091 Image playback device |
| 204 D-type flip-flop | |
| 301 Refresh timer | 1092 Compressed image expander |
| 302 Refresh timer request | |
| 401 One frame period | 1093 Sound playback device |
| 402 Image display period | |
| 501 Index registers | 1101 System interface |
| 502 Access address | 1102 System interface |
| 503 Access address | 1103 System interface |
| 601 CPU | 1121 Data bus |
| 602 Main storage device | 1122 Data bus |
| 603 Peripheral device | 1123 Data bus |
| | 1131 Access instruction signal |
| | 1132 Access instruction signal |
| | 5011 Index register |
| | 5012 Index register |
| | 5013 Index register |

What is claimed is:

1. A data transfer system, comprising:

a processor;

a first bus in communication with said processor for inputting data thereto and outputting data therefrom;

a first system device in communication with said processor via said first bus; and a data transfer control apparatus in communication with said processor via said first bus, comprising:

an external interface in communication with an external storage device for controlling data transfer operations accessing said external storage device;

a first system interface in communication with said first system device for controlling data transfer operations accessing said first system device;

a second bus in communication with said external and system interfaces for transferring data therebetween independent of said processor and said first bus;

a buffer interface in communication with buffer memory and said second bus for transferring data among said buffer memory, said external interface and said first system interface; and an arbiter in communication with said interfaces to arbitrate buffer access among said interfaces according to a predetermined programmable priority scheme.

2. The data transfer system of claim 1, wherein each of said interfaces include request means for issuing access requests to said arbiter for exchanging data via said second bus; and wherein said arbiter further comprises a communications circuit coupled to said interfaces of said data transfer control apparatus to receive the issued access requests; and an arbitration circuit in communication with said communications circuit and said interfaces to arbitrate among the received access requests and grant said interfaces access to said second bus as specified by said arbitrated access requests.

3. The data transfer system of claim 1, wherein said second bus transfers data among said interfaces concurrently with issuance of said data access request of said interfaces.

4. A data transfer system of claim 1, further comprising:

a second system interface in communication with a second system device, said arbiter and said first and second buses for controlling exchange of data therebetween, said second system device in communication with said processor via said first bus.

5. The data transfer system of claim 1, wherein said external interface issues an access request to write data to said buffer memory and specifies an address in said buffer memory to said arbiter;

said first system interface issues an access request to read data from said buffer memory or write data to said buffer memory when it has received a data transfer request from said first system device, and issues an address in said buffer memory to said arbiter;

said arbiter is configured to determine a relative priority for each access request issued, arbitrate all issued access requests at time intervals prescribed by a reference signal, and authorize one access request with the higher priority; and said buffer interface is configured to access said buffer memory according to the access request authorized by said arbiter at an address defined by access request.

6. The data transfer system of claim 1, further comprising a refresh timer which issues an access request to said arbiter to execute a refresh operation for said buffer memory, at preselected time intervals.

7. The data transfer system of claim 1, wherein said arbiter comprises a programmable element that varies the order of priority among received access requests in response to a control signal.

8. The data transfer system of claim 1, wherein said arbiter comprises a programmable element that varies the order of priority among received access requests in response to an external instruction stored in a register.

9. The data transfer system of claim 4, further comprising:

first and second index registers corresponding to and in communication with said first and second system interfaces to store address information; and address generation means coupled to said first and second registers, said interfaces and said arbiter for selectively generating altered address locations in which to access buffer memory based on adding address information stored in said registers to address values issued when an access request by one of said system interfaces is authorized by said arbiter.

10. A data transfer system, comprising:

a processor;

a first bus in communication with said processor for inputting data thereto and outputting data therefrom;

a plurality of system devices in communication with said processor via said first bus; and a data transfer control apparatus in communication with said processor via said first bus, comprising:

an external interface in communication with an external storage device for controlling data transfer operations accessing said external storage device;

a plurality of system interfaces, each corresponding to and in communication with one of said system devices for controlling data transfer operations accessing said system devices;

a second bus in communication with said external and system interfaces for transferring data therebetween independent of said processor and said first bus;

a buffer interface in communication with buffer memory and said second bus for transferring data among said buffer memory, said external interface and said system interfaces; and an arbiter in communication with said interfaces to arbitrate buffer access among said interfaces according to a predetermined programmable priority scheme.

11. The data transfer system of claim 10, further comprising:

a plurality of index registers, each corresponding to and in communication with one of said system interfaces and configured to store bits of address information; and means in communication with said index registers and said arbiter for selectively adding the bits stored in said index registers to address values for addresses specified by corresponding system interfaces when an access request by a given system interface is authorized by said arbiter, so as to generate an altered address location for buffer memory access.

12. The data transfer system of claim 10, wherein said arbiter is programmable for varying the order of priority among access requests generated by said interfaces and said processor in response to a control signal.

13. The data transfer system of claim 10, wherein at least one of said system devices comprises an image playback device which receives digitized image data in discrete picture element units for real time replay; and wherein said arbiter accords top priority to access requests involving said image playback device during an image display period.

14. A data transfer control subsystem for a process-controlled electronic device, comprising:

a buffer interface in processor independent communication with a buffer memory for controlling data access thereto;

an external interface in processor independent communication with said buffer interface and an external storage device to generate external access request signals for buffer memory access and control data transfer operations addressing said external storage device;

a first system interface in processor independent communication with said buffer and external interfaces and an image playback device to generate a first system access request signal for buffer memory access and control data transfer operations addressing said image playback device, said image playback device configured to replay digitized picture element units in real time;

a second system interface in processor independent communication with said buffer, external and first system interfaces and a compressed image expansion device to generate a second system access request signal for buffer memory access, relay compressed image data to said compressed image expansion device and transfer resultant uncompressed image data from said image expansion device to said image playback device via said first system interface;

a sound playback device in processor independent communication with said interfaces to generate a sound playback access request signal for buffer memory access and receive and replay digitized sound data;

a refresh timer device configured to periodically issue refresh access requests for refreshing contents of said buffer memory; and an arbiter in processor independent communication with said sound playback device, said refresh timer device and said interfaces to receive and arbitrate among respective access requests according to a pre-established order of priority and to grant buffer memory access to an access request originating member of the group consisting of said interfaces and said devices having a highest relative priority as defined by the pre-established order of priority, the pre-established order of priority comprising one of:

assigning refresh access requests the highest priority, assigning sound playback access requests a second-highest priority, assigning second system access requests a third-highest priority, and assigning external access requests a fourth-highest priority during an image retrace period; and assigning first system access requests the highest priority, assigning second system access requests the second-highest priority, assigning external access requests the third-highest level of priority, and assigning remaining requests the fourth-highest level of priority during an image display period.

15. Data transfer control apparatus for transferring data and distribution of said data between at least one storage device external to a data processing system and a plurality of system devices comprising:

at least one buffer memory for storing the transferred data;

a buffer interface connected to said buffer memory data with the authorized access originator when access instructions have been given;

a request arbiter for receiving and arbitrating requests for access to said buffer memory according to a pre-established order of priority in synchronization with an access cycle for said buffer memory, and for issuing access authorizations to originators of such access requests for one access request with the highest order of priority of those issued each access cycle, and for issuing said access instructions to said buffer interface;

an external interface for exchanging data with external storage device, issuing said requests for access to said request arbiter for implementing storage of data received from the external storage device in said buffer memory, and for exchanging data with said buffer interface when said access authorization is received;

a plurality of system interfaces connected in a 1-to-1 correspondence to exchange data with the plurality of system devices, and issue said requests for access to said request arbiter for each reading data to be passed to said system device from said buffer memory or writing data received from one of said plurality of system devices to said buffer memory, and exchange data with said buffer interface when said access authorization is received;

a plurality of said buffer interfaces, each independently connected to and controlling a buffer memory;

an equal number of arbiters as buffer interfaces such that they have a 1-to-1 correspondence; and wherein said system and external interfaces are configured to selectively issue access requests to one selected arbiter.

* * * * *